United States Patent Office 3,639,578
Patented Feb. 1, 1972

1

3,639,578
VIRUS INSECTICIDE

Othmer F. Batzer, Libertyville, Ill., assignor to International Minerals & Chemicals Corporation No Drawing. Filed Feb. 18, 1970, Ser. No. 12,446
Int. Cl. A61k *17/00;* C12k *1/06, 7/00*
U.S. Cl. 424—93 20 Claims

ABSTRACT OF THE DISCLOSURE

Disease insect larvae containing inclusion bodies with occluded virions are contacted with polar organic solvents to provide a dehydrated, substantially lipid-free powder that is readily dispersible.

BACKGROUND OF THE INVENTION

Biological pest control has been the subject of growing interest, stimulated in no small part by the ever increasing awareness of the potentially adverse side effects of broad spectrum chemical pesticides. Biological insect control can be achieved by a variety of means. For example, competing, harmless insect populations can be reared to control a harmful insect pest. The principal thrust of investigations into biological control, however, has focused on bacteria and viruses that are pathogenic for a particular pest. These insecticides can be manufactured in advance, stored in concentrated form and applied to selected areas at the most appropriate time.

Virus insecticides, and in particular those that contain proteinaceous inclusion bodies with occluded virions, have been reported for a variety of harmful insects including the cotton bollworm, the tobacco budworm, the cabbage looper, the fall armyworm, the beet armyworm, the alfalfa caterpillar and the like. Inclusion bodies with occluded virions, and the production and use of virus insecticides containing them are described, inter alia, in Steinhaus and Thompson, Preliminary Field Tests Using a Polyhedrosis Virus to Control the Alfalfa Caterpillar, Journal of Economic Entomology, vol. 42, No. 2, pp. 301–305, (April 1949); Ignoffo, Production and Virulence of a Nuclear-Polyhedrosis Virus from Larvae of Trichoplusa ni (Hubner) Reared on a Semi-synthetic Diet, Journal of Insect Pathology, 6, pp. 318–326 (1964); Ignoffo, The Nuclear-Polyhedrosis Virus of Heliothis zea (Boddie) and Heliothis virescens (Fabricius), Journal of Invertebrate Pathology, 7, No. 2, pp. 209–216 and 217–226 (June 1965); Ignoffo, Possibilities of Mass-Producing Insect Pathogens, Internat. Colloq. Insect Pathol. Netherlands, pp. 91–117 (1967); Ignoffo, Viruses—Living Insecticides, Current Topics in Microbiology and Immunology, vol. 42, pp. 129–167 (1968).

Virus insecticides are manufactured in vivo by infecting and later harvesting diseased larvae, either prior to or after death. The harvested larvae may be frozen and stored for later processing or they may be processed at the time of harvest. So-called raw suspensions of the virus have been made by triturating the larvae in water and diluting the suspension so obtained. A purified virus insecticide has been obtained by triturating in the presence of water, removing exoskeleton fragments, washing with water, and freeze-drying the resulting particles. If desired the particles may be mixed with an extender such as lactose or the like. The dried particles are stable and may be stored and shipped to the point of use.

Virus insecticides may be applied to the field as a dust or, as is more frequently the case, as a suspension.

2

DESCRIPTION OF THE INVENTION

It is a primary object of this invention to provide a powdered, readily dispersible virus insecticide.

It is an additional object of this invention to provide a method for preparing a dry, active, readily dispersible virus insecticide.

It is a further object of this invention to provide a method for treating infected larvae containing inclusion bodies with occluded virions to provide a dry, readily dispersible powder in high yield.

This invention is directed to a virus insecticide which comprises a powdered mixture containing inclusion bodies with occluded virions and comminuted larvae cell matter, said larvae cell matter being dehydrated and substantially lipid-free. This invention is also directed to the method of producing a virus insecticide which comprises contacting insect larvae containing inclusion bodies with occluded virions with a water miscible polar organic solvent in order to dehydrate the larvae and substantially remove lipids from the larvae, and separating the larvae from the solvent to provide a dehydrated active, readily dispersible powder.

Although triturating larvae in water provides a comminuted insecticide that disperses and is stable when freeze-dried, the insecticide of this invention may be comminuted to an even finer state and more readily disperses. The process of this invention dehydrates the larvae and eliminates the need for freeze-drying. The extraction provides high yields and does not adversely affect the inclusion body with occluded virions. Since inclusion bodies are not present in measurable quantities in the solvent after extraction, inclusion body and virion recovery is believed to approach 100 percent.

The virus insecticides of this invention are those that contain inclusion bodies with occluded virions. Inclusion bodies have a proteinaceous, crystalline-like structure and may contain 1 to 1,000 or more occluded viral particles or virions per inclusion body. Virus diseases caused by such viruses include, inter alia, nuclear polyhedroses, cytoplasmic polyhedroses, granuloses, insect pox-viroses. About 250 viruses of this type are known for a variety of arthropod hosts such as Lepidoptera (e.g. moths and butterflies): Hymenoptera (e.g., ants, bees and wasps); Diptera (e.g. flies and mosquitoes); Orthoptera (e.g. grasshoppers); and Neuroptera (e.g. lace wings).

Preferred embodiments of this invention embrace insecticides containing a nuclear polyhedrosis virus. Nuclear polyhedrosis viruses develop in the nuclei of infected cells, are DNA viruses, and have polyhedral inclusion bodies. Particularly preferred embodiments of this invention embrace insecticides containing the nuclear polyhedrosis virus for the cotton bollworm (*Heliothis zea*), the tobacco budworm (*Heliothis virescens*), the cabbage looper (*Trichoplusia ni*), the fall armyworm (*Laphygma frugiperda*) and the beet armyworm (*Laphygma exigua*). Anthropod viruses are described in more detail in Ignoffo, Viruses—Living Insecticides, Current Topics in Microbiology and Immunology, vol. 42, pp. 129–167 (1968); and Ignoffo, Possibilities of Mass-Producing Insect Pathogent, Internat. Colloq. Insect Pathol. Netherlands, pp. 99–117 (1967). Viruses readily may be obtained from scientific researchers or by simply collecting diseased larvae of a desired species in the field. Virus diseases occur naturally and any given virus is readily obtainable by field selection.

Inasmuch as the rearing and infection of larvae is known, is described in the literature, and is not the focus of this invention, it will not be described in great detail. Generally, eggs are permitted to hatch and the larvae are reared on either a natural or synthetic diet. At an appropriate point in time the larvae are infected, for example, by spraying the larvae and the growth medium with virus. The time of infection most often is so gauged as to permit maximum growth of the larvae (prior to pupation) before the virus infection overwhelms the larvae and causes death. Since virus production tends to be proportional to the weight of the harvested larvae, such procedure provides maximum virus production. The diseased larvae are harvested either prior to or after death. This invention is applicable to larvae harvested at either time. Larvae that are harvested dead may have higher potential insecticidal activity. In a typical production facility some larvae, on the order of 5%, are not infected and are used to sustain the culture.

The lipid content in larvae cells will, of course, vary among species. Frequently, however, the larvae will contain in excess of 10% lipids and may contain 20% or more lipids based on the dry solids content of the larvae. The final lipid content of larvae treated according to this invention generally will be less than about 2% by weight and, desirably, less than about 1% by weight.

In addition to removing lipids, the extraction of this invention effects an efficient dehydration. Larvae may contain on the order of 60% by weight of water with even higher percentages possible. This invention contemplates a moisture content of not more than about 10% by weight following extraction. Upon removal of the solvent, such products are stable free-flowing powders.

Solvents employed in the extraction of this invention are water miscible polar organic solvents, including inter alia, alcohols such as methyl alcohol, ethyl alcohol and propyl alcohol; ketones, such as acetone and methyl ethyl ketone; ethers, such as ethyl ether, dioxane, tetrahydrofuran; and halogenated hydrocarbons such as chloroform and carbon tetrachloride. Lipid solvents constitute a class of solvents known to the art.

The extraction contemplated by this invention readily can be carried out at room temperature, and is operable within wide temperature limits. The extremes of the temperature range are not limited by extraction considerations, but are determined by other factors. For example, on the one hand, low temperatures at which ice crystals form are not desirable while, on the other hand, high temperatures at which the protein may be denatured also are not desirable. Preferably the extraction is carried out between about 10° C. and about 50° C.

The extraction can be performed on larvae that have been separated from the growth medium or on larvae with the growth medium still present. The extraction is applicable either to freshly harvested larvae or to previously freeze-dried larvae. Moreover, the larvae can be intact or can be comminuted either before or during the extraction. Comminution before or during extraction tends to increase extraction efficiency, may eliminate the need for grinding the final product, and is preferred.

Continuous extraction with a moving stream of solvent or serial extraction in which larvae are contacted with solvent two or mor etimes are preferred for the practice of this invention. The time of the extraction is variable depending on the solvent, size of larvae, temperature and the like, and may require up to an hour or more. The volume of solvent, temperature of extraction and time of extraction are matters of choice within the skill of the routineer.

After extraction to provide a desired water and lipid content is complete the medium may be centrifuged or filtered to separate the solids and the solvent, and the solid residue dried. Drying can be accomplished under vacuum conditions or the residue may be air dried at ambient temperature or at temperatures up to about 50° C. After the dehydrated substantially lipid-free residue is dried, it may, if necessary, be ground to a very fine, free-flowing powder. Stable powders of −200 or −250 mesh (Tyler mesh size) easily can be produced. In contrast, freeze-dried larvae cannot easily be processed into −200 mesh powders. The powders of this invention are produced in high yield and readily disperse in water or oil.

The term insecticide as employed herein embraces powders containing viruses and cell matter with or without growth medium or solid extenders such as lactose, talc or the like. These powders may be used as such or may be formulated into dusts or water or oil suspensions. Formulations may also contain ultra violet light absorbers, surfactants, buffer salts and the like.

The following examples are included for illustrative purposes only and are not intended to limit the scope of the invention.

The potency of the products of the following examples ($LD_{50}$) are reported as micrograms per milliliter of nutrient required to provide a lethal dose for 50% of first instar larvae grown at 30° C. The nutrient employed for such tests had the following composition:

| Ingredient: | | Amount |
|---|---|---|
| Distilled water | ml | 3,100 |
| Methyl parahydroxybenzoate (15% w./v. in 95% ethyl alcohol) | ml | 36 |
| Choline chloride (0.1 g./ml. water) | ml | 36 |
| Potassium hydroxide, 4 molar | ml | 18 |
| Formalin (0.1 g./ml.) | ml | 15 |
| Vitamin stock [1] | ml | 6 |
| Casein | g | 126 |
| Sucrose | g | 126 |
| Wheat germ | g | 108 |
| Agar | g | 90 |
| Wesson's salts | g | 36 |
| Alphacel | g | 18 |
| Ascorbic acid | g | 15 |
| Antibiotic (chlortetracycline, kanamycin) | | |

[1] 600 mg. niacin, 600 mg. calcium pantothenate, 300 mg. riboflavin, 150 mg. each of thiamin, pyridoxin, and folic acid, 12 mg. biotin, and 1.2 mg. of vitamin B–12 in 100 ml. distilled water.

Preparation of nutrient is described in Journal of Invertebrate Pathology, 7, No. 2, pp. 217–226 (June 1965)

EXAMPLE I

Sixty grams (wet weight) of near-dead virus infected *Heliothis zea* larvae (cotton bollworm) was subject to serial extraction with cold acetone (approximately 10° C.) in a kitchen-size Waring blender. The mixture was centrifuged and the solvent layer discarded between each extraction.

| Extraction | Volume of solvent, ml. | Time, min. |
|---|---|---|
| 1 | 300 | 1 |
| 2 | 300 | 5 |
| 3 | 300 | 5 |
| 4 | 300 | 5 |

After the final extraction the acetone-solids mixture was filtered and the residue was dried under vacuum. The process yielded 9.4 grams of a finely divided pale tan highly active powder. The product was characterized by a moisture content of 7.6%, a lipid content of 0.53% and a protein content of 69.5%. The $LD_{50}$ of the product was 0.06 μg./ml.

EXAMPLE II

Example I was repeated employing isopropyl alcohol instead of acetone. The process yielded 9.3 grams of a pale tan highly active powder (−200 mesh) that was characterized by a moisture content of 6%, a lipid content of 0.58%, and a protein content of 66.6%. The $LD_{50}$ of the product was 0.14 μg./ml.

EXAMPLE III

Fifty near-dead diseased Heliothis zea intact larvae were extracted by being allowed to stand in acetone at about 10° C. The acetone was decanted after each extraction.

| Extraction | Volume of solvent, ml. | Time, min. |
|---|---|---|
| 1 | 400 | 15 |
| 2 | 200 | 15 |
| 3 | 100 | 30 |
| 4 | 50 | 30 |
| 5 | 50 | 60 |

The dehydrated intact extracted larvae were air dried and very easily pulverized to a −200 mesh greyish white powder that contained less than 1% lipids.

EXAMPLE IV

Approximately 207 grams (wet weight) of mixture containing 123 dead *Heliothis zea* larvae and media were triturated with 690 milliliters of water containing 345 grams of ice. The mixture was centrifuged and the comminuted residue subjected to serial extraction with acetone at about 10° C. The mixture was separated from the solvent between each extraction.

| Extraction | Volume of solvent, ml. | Time, min. |
|---|---|---|
| 1 | 2,000 | 15 |
| 2 | 1,000 | 15 |
| 3 | 1,000 | 15 |
| 4 | 1,000 | 15 |
| 5 | 1,000 | 15 |

The product was vacuum dried to yield 14.6 grams of a light brown powder having an $LD_{50}$ of 0.03 $\mu$g./ml. The powder contained less than 1% lipids. The larvae growth medium was the same as that employed for the $LD_{50}$ tests.

EXAMPLE V

The process of Example IV was repeated with 119 dead larvae, free of media. The process yielded 2.67 grams of light brown powder that had an $LD_{50}$ of 0.003 $\mu$g./mg. The lipid content was less than 1% by weight.

EXAMPLE VI

In order to illustrate the removal of lipid in each of several succesive extractions with acetone, a 2,340 gram sample of micro pulverized frozen *Heliothis zea* larvae was subjected to extraction with acetone at about 10° C. in a mixing tank with a stirrer.

| Extraction | Time | Wt. ratio solvent/ wet cake | Total lipids remaining (g.) | Percent lipid removal |
|---|---|---|---|---|
| Sample | | | 79.6 | |
| 1 | | 5/1 | 9.3 | 88.3 |
| 2 | | 4/1 | 5.3 | 93.3 |
| 3 | | 2/1 | 2.0 | 97.5 |

The process provided 259 grams of a finely powdered stable product with a lipid content of about 0.7%, a moisture content of about 10%, and a protein content of about 61.7%. The $LD_{50}$ of the product was 0.001 $\mu$g./mg.

EXAMPLE VII

Approximately 5,798 grams of dead diseased *Heliothis zea* were extracted with 12 gallons of acetone at about 10° C. Appropriate portions of larvae and acetone were processed in a one gallon Waring blender for 2 minutes (each portion) and then filtered. The residue was twice resuspended in 7 gallons of acetone for ½ hour each time. The final product was air dried to yield 954 grams of an easily dispersible powder having a lipid content of less than 1%. The product was characterized by an $LD_{50}$ of 0.001 $\mu$g./ml.

The processes of the above examples in which comminuted larvae were extracted or in which the larvae were comminuted during extraction provided a stable powder that contained a substantial portion of very fine particles, approximately 60% −325 mesh, with still other particles being −200 +325 mesh. Any +200 mesh particles were very easily broken up merely by pressing them through a 200 mesh screen. The process of this invention can be performed to provide a fine powder without the need for any pulverizing after the extraction. The process also provides a dehydrated product without the need for techniques such as freeze-drying.

I claim:

1. The method of producing a virus insecticide comprising contacting insect larvae containing inclusion bodies with occluded virions with a water miscible polar organic solvent in order to dehydrate the larvae and substantially remove lipids from the larvae, and separating the larvae from the solvent to provide a dehydrated, readily dispersible powder.

2. The method of claim 1 in which the larvae are in a comminuted state during the extraction.

3. The method of claim 1 in which the virus is a nuclear polyhedrosis virus.

4. The method of claim 3 in which the larvae are in a comminuted state during the extraction.

5. The method of claim 3 in which the larvae are comminuted during the extraction.

6. The method of claim 3 in which the virus is a *Heliothis zea* virus.

7. The method of claim 3 in which the virus is a *Heliothis virescens* virus.

8. The method of claim 3 in which the virus is a *Trichoplusia ni* virus.

9. The method of claim 3 in which the virus is a *Laphygma frugiperda* virus.

10. The method of claim 3 in which the virus is a *Laphygma exigua* virus.

11. A virus insecticide comprising a powdered mixture containing inclusion bodies with occluded virions and comminuted larvae cell matter, said larvae cell matter being dehydrated and substantially lipid-free produced in accordance with the method of claim 11.

12. The insecticide of claim 11 in which the mixture contains less than about 1% lipids by weight.

13. The insecticide of claim 11 in which the virus is a nuclear polyhedrosis virus.

14. The insecticide of claim 13 in which the mixture contains less than 1% lipids by weight.

15. The insecticide of claim 13 in which the virus is a *Heliothis zea* virus.

16. The insecticide of claim 15 in which the mixture contains less than about 1% lipids by weight.

17. The insecticide of claim 13 in which the virus is a *Heliothis virescens* virus.

18. The insecticide of claim 13 in which the virus is a *Trichoplusia ni* virus.

19. The insecticide of claim 13 in which the virus is a *Laphygma frugiperda* virus.

20. The insecticide of claim 13 in which the virus is a *Laphygma exigua* virus.

References Cited

UNITED STATES PATENTS 3,541,203 11/1970 Fogle et al. ---------- 424—93 X

SHEP K. ROSE, Primary Examiner

U.S. Cl. X.R.

195—1.5; 424—89